US008333265B2

(12) United States Patent
Kang et al.

(10) Patent No.: US 8,333,265 B2
(45) Date of Patent: Dec. 18, 2012

(54) ELEVATOR SYSTEM WITH REGULATED INPUT POWER

(75) Inventors: Pengju Kang, Yorktown Heights, NY (US); Mauro J. Atalla, South Glastonbury, CT (US); Daryl J. Marvin, Farmington, CT (US); Vladimir Blasko, Avon, CT (US); Robert K. Thornton, Coventry, CT (US); Stella M. Oggianu, Manchester, CT (US)

(73) Assignee: Otis Elevator Company, Farmington, CT (US)

( * ) Notice: Subject to any disclaimer, the term of this patent is extended or adjusted under 35 U.S.C. 154(b) by 668 days.

(21) Appl. No.: 12/438,904

(22) PCT Filed: Aug. 31, 2006

(86) PCT No.: PCT/US2006/034205
§ 371 (c)(1),
(2), (4) Date: Dec. 8, 2009

(87) PCT Pub. No.: WO2008/027052
PCT Pub. Date: Mar. 6, 2008

(65) Prior Publication Data
US 2010/0116595 A1    May 13, 2010

(51) Int. Cl.
*B66B 1/06* (2006.01)
(52) U.S. Cl. .......................... 187/289; 323/255
(58) Field of Classification Search .................. 187/290, 187/293, 296, 297, 247, 391–393; 307/64, 307/66, 77; 323/207, 255, 258, 259; 363/16, 363/37, 98
See application file for complete search history.

(56) References Cited

U.S. PATENT DOCUMENTS

| 4,042,068 | A |   | 8/1977  | Ostrander et al. |         |
|-----------|---|---|---------|------------------|---------|
| 4,061,958 | A |   | 12/1977 | Walker           |         |
| 4,519,479 | A | * | 5/1985  | Tanahashi        | 187/289 |
| 4,640,389 | A | * | 2/1987  | Kamaike          | 187/296 |
| 4,982,816 | A |   | 1/1991  | Doi et al.       |         |
| 5,058,710 | A | * | 10/1991 | Iwasa            | 187/290 |
| 5,225,754 | A | * | 7/1993  | Eckersley        | 318/560 |
| 5,229,558 | A | * | 7/1993  | Hakala           | 187/293 |
| 5,285,029 | A | * | 2/1994  | Araki            | 187/290 |
| 5,808,454 | A | * | 9/1998  | Chung            | 323/255 |

(Continued)

FOREIGN PATENT DOCUMENTS
JP    60164222    10/1985
(Continued)

OTHER PUBLICATIONS
WO 2006/069591 A.*
(Continued)

*Primary Examiner* — Anthony Salata
(74) *Attorney, Agent, or Firm* — Kinney & Lange, P.A.

(57) ABSTRACT

A device (22) manages power source variations in an elevator system. The device includes a transformer (60) having a primary (62) and a secondary (64). An input of the elevator system is connected to the secondary (64). Tap switches (66a, 66b, 66c, 66d) are connected to the transformer (60) such that each tap switch is connected to a tap point (68a, 68b, 68c, 68d) on the transformer (60). A controller (54) operates the tap switches (66a, 66b, 66c, 66d) based on a sensed power source output to provide power on the secondary (64) within a tolerance band of the elevator system.

18 Claims, 2 Drawing Sheets

U.S. PATENT DOCUMENTS

| | | | | |
|---|---|---|---|---|
| 5,821,739 | A | * | 10/1998 | Imoto .......................... 323/258 |
| 5,825,164 | A | * | 10/1998 | Williams ...................... 323/255 |
| 5,864,474 | A | * | 1/1999 | Jang .............................. 363/39 |
| 5,893,432 | A | * | 4/1999 | Nguyen et al. ................ 187/290 |
| 6,100,673 | A | * | 8/2000 | Bair et al. ..................... 323/255 |
| 6,417,651 | B1 | * | 7/2002 | Kronberg ...................... 323/255 |
| 6,446,760 | B1 | | 9/2002 | Lisi |
| 6,664,771 | B2 | * | 12/2003 | Scoggins et al. .............. 323/257 |
| 7,009,312 | B2 | * | 3/2006 | Hernandez-Marti et al. ... 307/34 |
| 7,227,330 | B2 | * | 6/2007 | Swamy et al. ................ 318/798 |
| 7,275,622 | B2 | * | 10/2007 | Hall et al. ..................... 187/290 |
| 7,650,968 | B2 | * | 1/2010 | Oesterle et al. ............... 187/290 |
| 7,775,328 | B2 | * | 8/2010 | Robledo Barrio et al. ... 187/290 |
| 8,096,387 | B2 | * | 1/2012 | Kattainen et al. ............. 187/248 |
| 8,127,894 | B2 | * | 3/2012 | Agirman et al. .............. 187/290 |
| 2004/0189097 | A1 | * | 9/2004 | Gottlieb et al. ................ 307/64 |

FOREIGN PATENT DOCUMENTS

| | | |
|---|---|---|
| JP | 61194998 | 12/1986 |
| JP | 63028260 | 2/1988 |
| JP | 2136067 A | 5/1990 |
| WO | 2006069591 A1 | 7/2006 |

OTHER PUBLICATIONS

PCT International Search Report and Written Opinion, Jun. 12, 2008, 6 pages.

Japanese Patent Office, Japanese Office Action, Jan. 24, 2012, 2 pages.

* cited by examiner

ELEVATOR SYSTEM WITH REGULATED INPUT POWER

BACKGROUND OF THE INVENTION

The present invention relates to the field of power systems. In particular, the present invention relates to a device for managing variations in power source quality in an elevator system.

An elevator drive system is typically designed to operate over a specific input voltage range from a power source. The components of the drive have voltage and current ratings that allow the drive to continuously operate while the power supply remains within the designed input voltage range. However, in certain markets the utility network is less reliable, where persistent utility voltage sags or brownout conditions (i.e., voltage conditions below the tolerance band of the drive) and/or over-voltage conditions are prevalent. These changes in the voltage levels in a power system are collectively known as power quality events. When utility voltage sags occur, the drive draws more current from the power supply to maintain uniform power to the hoist motor. In conventional systems, when excess current is being drawn from the power supply, the drive will shut down to avoid damaging the components of the drive. In addition, when an over-voltage condition occurs, the components of the elevator system may be damaged when they are forced to operate above their power tolerance band. This can lead to component deterioration and failure, resulting in the need for repair or replacement of the damaged components.

BRIEF SUMMARY OF THE INVENTION

The subject invention is directed to a device for managing power source variations in an elevator system. The device includes a transformer having a primary and a secondary. An input of the elevator system is connected to the secondary. Tap switches are connected to the transformer such that each tap switch is connected to a tap point on the transformer. A controller operates the tap switches based on a sensed power source output to provide power on the secondary within a tolerance band of the elevator system.

DETAILED DESCRIPTION

Figure 1:
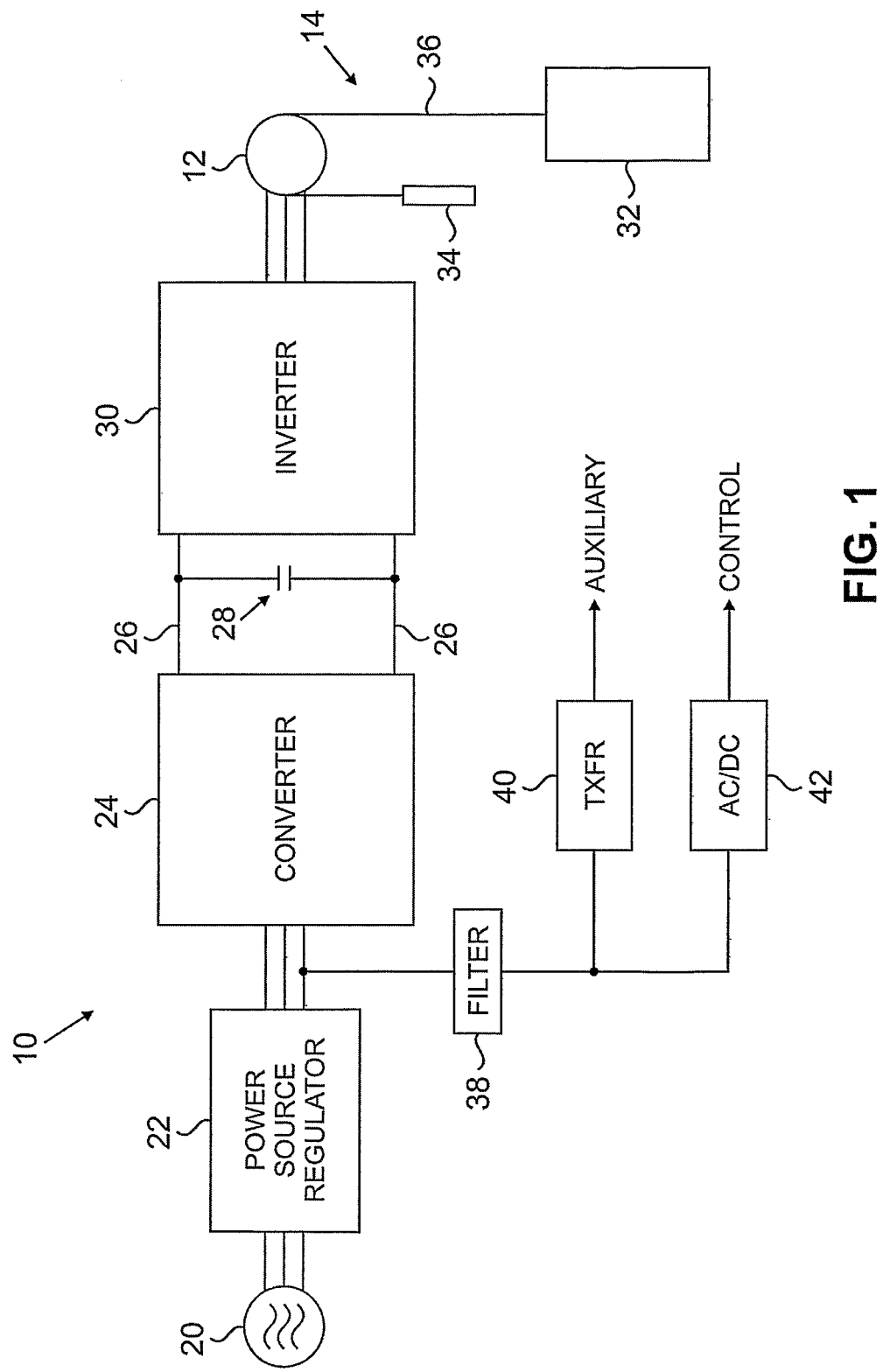
FIG. 1 is a schematic view of a power system for driving an elevator hoist motor.

FIG. 1 is a schematic view of power system 10 for driving hoist motor 12 of elevator 14 including power source 20 and an elevator drive system including power source regulator 22, power converter 24, power bus 26, smoothing capacitor 28, and power inverter 30. Power source 20 may be electricity supplied from an electrical utility, such as a commercial power source. Elevator 14 includes elevator car 32 and counterweight 34 that are connected through roping 36 to hoist motor 12. Power system 10 also includes filter 38, transformer 40, and AC-to-DC converter 42 to deliver power to elevator auxiliary and control systems.

As will be described herein, power system 10 is configured to manage variations in voltage from power source 20 to deliver regulated power to drive hoist motor 12. For example, in certain markets the utility network is less reliable, where persistent utility voltage sags or brownout conditions (i.e., voltage conditions below the tolerance band of the drive) are prevalent. Power system 10 according to the present invention allows for continuous operation of hoist motor 12 at normal operating conditions during these periods of irregularity. While the following description is directed to driving an elevator hoist motor, it will be appreciated that power source regulator 22 may be employed to deliver regulated power to any type of load.

Power converter 24 and power inverter 30 are connected by power bus 26. Smoothing capacitor 28 is connected across power bus 26. Power source 20 provides electrical power to power source regulator 22, which manages variations in power source 20. The operation of power source regulator 22 will be described in more detail with regard to FIG. 2. Power source regulator 22 delivers regulated power to power converter 24. Power converter 24 may be a three-phase power inverter that is operable to convert three-phase AC power from power source 20 to DC power. In one embodiment, power converter 24 comprises a plurality of power transistor circuits including parallel-connected transistors and diodes. The DC output power is provided by power converter 24 on power bus 26. Smoothing capacitor 28 smoothes the rectified power provided by power converter 24 on DC power bus 26. Power converter 24 is also operable to invert power on power bus 26 to be returned to power source 20. This regenerative configuration reduces the demand on power source 20. It is important to note that while power source 20 is shown as a three-phase AC power source, power system 10 may be adapted to receive power from any type of power source, including (but not limited to) a single-phase AC power source and a DC power source.

Power inverter 30 may be a three-phase power inverter that is operable to invert DC power from power bus 26 to three-phase AC power. Power inverter 30 may comprise a plurality of power transistor circuits including parallel-connected transistors and diodes. Power inverter 30 delivers the three-phase power to hoist motor 12 at the outputs of power inverter 30. In addition, power inverter 30 is operable to rectify power that is generated when elevator 14 drives hoist motor 12. For example, if hoist motor 12 is generating power, power inverter 30 converts the generated power and provides it to power bus 26. Smoothing capacitor 28 smoothes the converted power provided by power inverter 30 on power bus 26. In an alternative embodiment, power inverter 30 is a single-phase power inverter that is operable to invert DC power from power bus 26 to single-phase AC power for delivery to hoist motor 12.

Hoist motor 12 controls the speed and direction of movement between elevator car 32 and counterweight 34. The power required to drive hoist motor 12 varies with the acceleration and direction of elevator 14, as well as the load in elevator car 32. For example, if elevator car 32 is being accelerated, run up with a load greater than the weight of counterweight 34 (i.e., heavy load), or run down with a load less than the weight of counterweight 34 (i.e., light load), a maximal amount of power is required to drive hoist motor 12. If elevator 14 is leveling or running at a fixed speed with a balanced load, it may be using a lesser amount of power. If elevator car 32 is being decelerated, running down with a heavy load, or running up with a light load, elevator car 32 drives hoist motor 12. In this case, hoist motor 12 generates power that is converted to DC power by power inverter 30. The converted DC power may be returned to power source 20 and/or dissipated in a dynamic brake resistor connected across power bus 26 (not shown).

It should be noted that while a single hoist motor 12 is shown connected to power system 10, power system 10 may be modified to power multiple hoist motors 12. For example, a plurality of power inverters 30 may be connected in parallel across power bus 26 to provide power to a plurality of hoist motors 12. As another example, a plurality of drive systems (including converter 24, power bus 26, smoothing capacitor 28, and inverter 30) may be connected in parallel to power source regulator 22 such that each drive system provides power to a hoist motor 12.

Power system 10 may also provide power to other electrical systems, such as auxiliary systems (e.g., machine fans, lighting and outlets of elevator car 32, and safety chains), and control systems (e.g., elevator system control boards, elevator position reference system, and passenger identification systems). The auxiliary systems are connected to power source regulator 22 through transient filter 38 and transformer 40. Transformer 40 provides stepped-down power from power source regulator 22 to the auxiliary systems. The components of the control system use DC power, and thus the control systems are connected to power source regulator 22 through transient filter 38 and AC-to-DC converter 42. In an alternative embodiment, the hoist motor drive system is configured to handle variations in power source 20, and power source regulator 22 provides power to the auxiliary systems instead of transformer 40. In another alternative embodiment, the hoist motor drive system is configured to handle variations in power source 20, and power source regulator 22 is connected after filter 38 to provide regulated power to transformer 40 and AC-to-DC converter 42.

Figure 2:
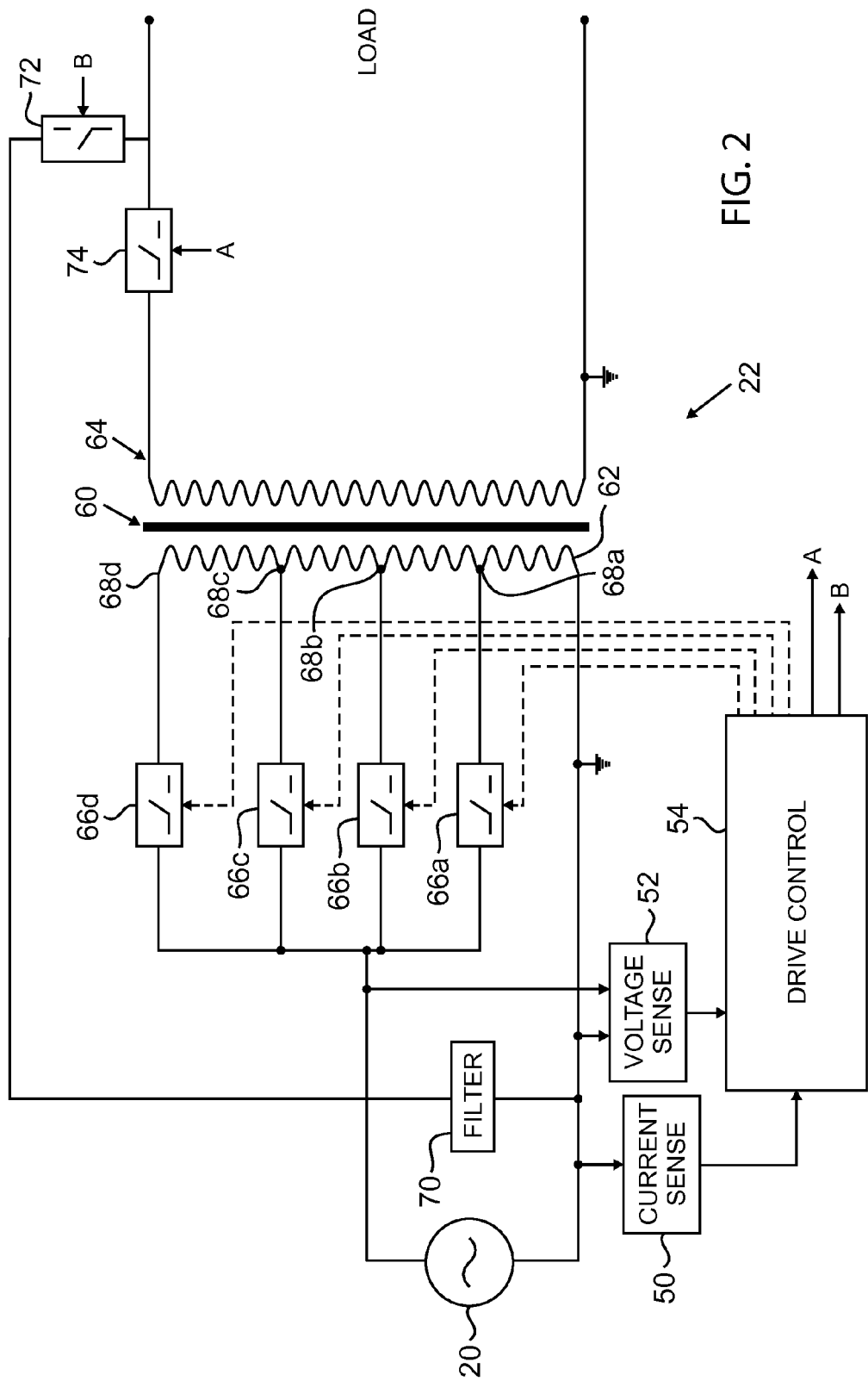
FIG. 2 is a schematic view of a device for managing variations in an elevator system power source.

FIG. 2 is a schematic of power source regulator 22 that manages variations in power source 20. In particular, if power source 20 delivers a voltage to power source regulator 22 that is outside the tolerance band of the elevator system (e.g., within 10% of the normal operating voltage), power source regulator 22 adjusts the voltage to provide the elevator system with a voltage within the tolerance band of the elevator system. Power source regulator 22 includes current sensor 50, voltage sensor 52, drive control 54, transformer 60 including primary 62 and secondary 64, tap switches 66a, 66b, 66c, and 66d, tap points 68a, 68b, 68c, and 68d, transient filter 70, and bypass switches 72 and 74. For ease of illustration, power source regulator 22 is shown regulating a single phase of three-phase power source 20. Each of the other phases may be connected to a similar system to provide regulation of all three phases of power source 20.

Power source 20 is connected between tap switches 66a-66d and ground. Voltage sensor 52 is connected to sense the voltage across power source 20, and current sensor 50 is connected to sense the current from power source 20. Current sensor 50 and voltage sensor 52 provide signals to drive control 52. Drive control 54 provides signals to tap switches 66a-66d as well as bypass switches 72 and 74. Tap switches 66a, 66b, 66c, and 66d are connected to tap points 68a, 68b, 68c, and 68d, respectively on primary 62. Transient filter 70 is connected between bypass switch 72 and ground. In the embodiment shown, secondary 64 includes a single winding to which the load (i.e., elevator power system 10) is connected. However, secondary 64 may also include multiple windings that are each connectable to a different load such that power voltage regulator 22 provides regulated power to multiple systems.

Voltage sensor 52 monitors the voltage across power source 20 and provides signals related to the sensed voltage to drive control 54. In one embodiment, voltage sensor 52 senses the voltage across power source 20 each half-cycle of power source 20. Drive control 54 compares the voltage sensed by voltage sensor 52 to a stored expected voltage and operates tap switches 66a-66d to regulate the voltage on secondary 64. In particular, if the voltage across power source 20 is normal or within the tolerance band of the elevator system, drive control 54 closes the tap switch that provides no step up or step down of the voltage from power source 20. For example, transformer 60 may be configured such that closing tap switch 66b provides the voltage from power source 20 on secondary 64. Thus, when power source 20 is operating under normal conditions, drive control 54 closes tap switch 66b and opens tap switches 66a, 66c, and 66d to connect power source 20 between tap point 68b and ground on primary 62. This provides the voltage from power source 20 with no step up or step down on secondary 64 to the load.

If drive control 54 receives a signal from voltage sensor 52 that indicates that power source 20 is operating outside the tolerance band of the elevator system, drive control 54 operates tap switches 66a-66d to adjust the voltage provided to the load to within the tolerance band. Drive control 54 may also require that the voltage remains outside the tolerance band for a period of time before the voltage provided to the load on secondary 64 is adjusted. For example, if the signal from voltage sensor 52 indicates an over-voltage condition (i.e., the voltage across power source 20 is above the tolerance band of the elevator system), drive control 54 may control tap switches 66a-66d to reduce the number of turns on primary 62 that power source 20 is connected across to reduce the voltage induced in secondary 64. In the example above, drive control 54 may open tap switch 66b (which is closed during normal operation) and close tap switch 66a to connect power source 20 between tap point 68a and ground. This reduces the number of turns on primary 62 that power source 20 is connected across, which in turn reduces the voltage provided to the elevator system. Drive control 54 maintains the tap switches in this configuration until the voltage across voltage source 20 changes such that tap switches 66a-66d need to be controlled again to provide voltage to the elevator system within its tolerance band.

If the signal from voltage sensor 52 indicates an under-voltage condition (i.e., the voltage across power source 20 is below the tolerance band of the elevator system), drive control 54 may control tap switches 66a-66d to increase the number of turns on primary 62 that power source 20 is connected across to increase the voltage on secondary 64. In the example above, drive control 54 may open tap switch 66b (which is closed during normal operation) and close either of tap switches 66c or 66d to connect power source 20 between tap point 68c or 68d and ground. This increases the number of turns on primary 62 that power source 20 is connected across, which in turn increases the voltage provided to the elevator system. Drive control 54 determines whether tap switch 66c or 66d is closed based on the amount that the voltage across power source 20 drops below the tolerance band. In particular, the more power source 20 drops below the tolerance band, the greater the number of turns on primary 62 that power source 20 is connected across. Drive control 54 maintains the tap switches in this configuration until the voltage across voltage source 20 changes such that tap switches 66a-66d need to be controlled again to provide voltage to the elevator system within its tolerance band.

While power source regulator 22 is shown including transformer 60 having a single winding primary 62 and a single winding secondary 64, variations on this design can be made without departing from the present invention. For example, primary 62 and secondary 64 may include any number of windings, and tap switches may be connected to any number of tap points along primary 62 and/or secondary 64 to provide more levels of voltage regulation. In addition, transformer 60 may be provided in an autotransformer configuration including a single winding having a primary side and a secondary side such that power source 20 is connected to the primary side and tap switches are connected along the secondary side of the autotransformer.

Power source regulator 22 may also include a bypass protection system that allows the load to be disconnected from transformer 60 and connected directly to power source 20 if a permanent fault in power source regulator 22 occurs. For example, in the embodiment shown in FIG. 2, bypass switches 72 and 74 are connected between the load and ground and between secondary 64 and the load, respectively. Bypass switches 72 and 74 are controlled by drive control 54 based on signals received from current sensor 50. Current sensor 50 measures the current from power source 20 and through primary 62. Under normal operating conditions, drive control 54 opens bypass switch 72 (via signal line B) and closes bypass switch 74 (via signal line A) to allow regulation of power source 20 through transformer 60. If current sensor 50 provides a signal to drive control 54 that indicates that an over-current condition exists (i.e., a current that exceeds the tolerance band of the load) and power source regulator 22 is not operating properly, drive control 54 provides a signal to open bypass switch 74 and close bypass switch 72 to connect the load directly to power source 20 and protect the load from the over-current fault. In one embodiment, drive control 54 opens bypass switch 74 if the over-current condition exists for a programmed threshold period of time. Transient filter 70, which may be an RLC filter or a surge arrester, absorbs transient current that may be produced by power source 20. After the current through primary 62 returns to normal (as sensed by current sensor 50), drive control 54 provides a signal that opens bypass switch 72 and closes bypass switch 74.

In summary, the subject invention is directed to a device for managing power source variations in an elevator system. The device includes a transformer having a primary and a secondary. An input of the elevator system is connected to the secondary. Tap switches are connected to the transformer such that each tap switch is connected to a tap point on the transformer. A controller operates the tap switches based on a sensed power source output to provide power on the secondary within a tolerance band of the elevator system. By providing regulated power to the elevator system, over-voltage and under-voltage power quality conditions from the power source are corrected, thus avoiding costly damage to the electrical components of the elevator system.

Although the present invention has been described with reference to examples and preferred embodiments, workers skilled in the art will recognize that changes may be made in form and detail without departing from the spirit and scope of the invention.

The invention claimed is:

1. A device for managing power source variations in an elevator system, the device comprising:
   a transformer including a primary and a secondary, wherein power from a power source is received by the primary, and wherein an input of the elevator system is connected to the secondary;
   a plurality of tap switches connected between the power source and the primary of the transformer, wherein each tap switch is connected to one of a plurality of tap points on the primary of the transformer; and
   a controller that operates the tap switches based on a sensed voltage from the power source to provide power on the secondary within a tolerance band of the elevator system so that the elevator system continues operation during voltage sag or brownout conditions of the power source.

2. The device of claim 1, wherein the controller comprises a voltage sensor for sensing the voltage from the power source, and providing a signal to the controller related to the sensed voltage.

3. The device of claim 1, wherein the controller operates the tap switches based on a comparison of the sensed voltage to an expected power source voltage.

4. The device of claim 1, and further comprising:
   an over-current protection circuit that disconnects the elevator system from the secondary if the controller senses an over-current condition on the primary.

5. The device of claim 1, wherein the tap switches comprise devices selected from the group consisting of relays, field effect transistors (FETs), insulated gate bipolar transistors (IGBTs), gate turn-off (GTO) thyristors, integrated gate commutated thyristors (IGCTs), triacs, silicon controlled rectifiers (SCRs), and bipolar transistors.

6. The device of claim 1, wherein the secondary comprises a plurality of windings.

7. The device of claim 1, and further comprising:
   a transient filter coupled to the secondary for suppressing voltage transients in the device.

8. A method for managing power source variations to provide regulated power to an elevator system, the method comprising:
   monitoring a power source voltage received from a power utility;
   determining whether the power source voltage is within a tolerance band of the elevator system; and
   regulating the voltage provided to the elevator system in response to variations of the power source voltage from the tolerance band to maintain the voltage provided to the elevator system within the tolerance band and thereby allow continued operation of the elevator system using the power received from the power utility during periods when the power source voltage is below the tolerance band;
   wherein the power source is connected through a plurality of tap switches to a transformer primary winding and the elevator system is connected to a transformer secondary winding;
   wherein each tap switch is connected to one of a plurality of tap points on the transformer primary winding; and
   wherein regulating the voltage provided to the elevator system includes controlling the plurality of tap switches to adjust a connection of the power source to the transformer primary winding such that an output voltage provided on the secondary winding is within the tolerance band.

9. The method of claim 8, wherein determining whether the power source voltage is within a tolerance band of the elevator system comprises comparing the monitored power source voltage to an expected power source voltage.

10. The method of claim 8, wherein regulating the voltage provided to the power system comprises selecting a transformer primary to secondary winding ratio as a function of variations of the power source voltage.

11. The method of claim 8, and further comprising:
    monitoring a power source current; and
    disconnecting the elevator system from the transformer secondary winding if the current exceeds a threshold current.

12. An elevator power system comprising:
- a power source input for receiving power from a power utility;
- a transformer including a primary connected to the power source input and a secondary for supplying power to a load;
- a plurality of tap switches connected between the power source input and the primary of the transformer, wherein each tap switch is connected to one of a plurality of tap points on the primary of the transformer; and
- a controller that operates the tap switches based on a sensed voltage at the power source input to provide power from the secondary within a tolerance band of the load, so that the load continues operation during periods when the sensed voltage is below the tolerance band of the load.

13. The elevator power system of claim 12, wherein the controller comprises a voltage sensor for sensing voltage at the power source input and providing a signal to the controller related to the sensed voltage.

14. The elevator power system of claim 12, wherein the controller operates the tap switches based on a comparison of the sensed voltage to an expected power source input voltage.

15. The elevator power system of claim 12, and further comprising:
- an over-current protection circuit that disconnects the load from the secondary if the controller senses an over-current condition on the primary.

16. The elevator power system of claim 12, wherein the tap switches comprise devices selected from the group consisting of relays, field effect transistors (FETs), insulated gate bipolar transistors (IGBTs), gate turn-off (GTO) thyristors, integrated gate commutated thyristors (IGCTs), triacs, silicon controlled rectifiers (SCRs), and bipolar transistors.

17. The elevator power system of claim 12, wherein the secondary comprises a plurality of windings.

18. The elevator power system of claim 12, wherein the load comprises an elevator hoist motor.

* * * * *